Patented May 23, 1944

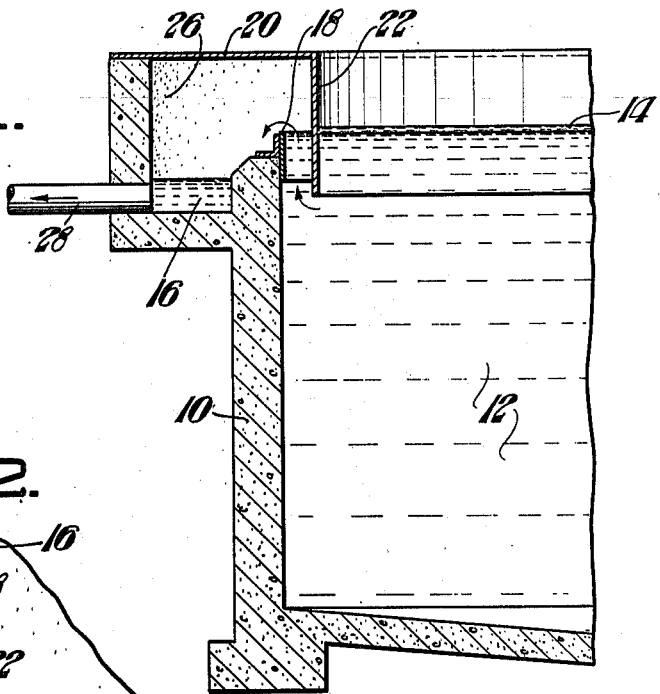
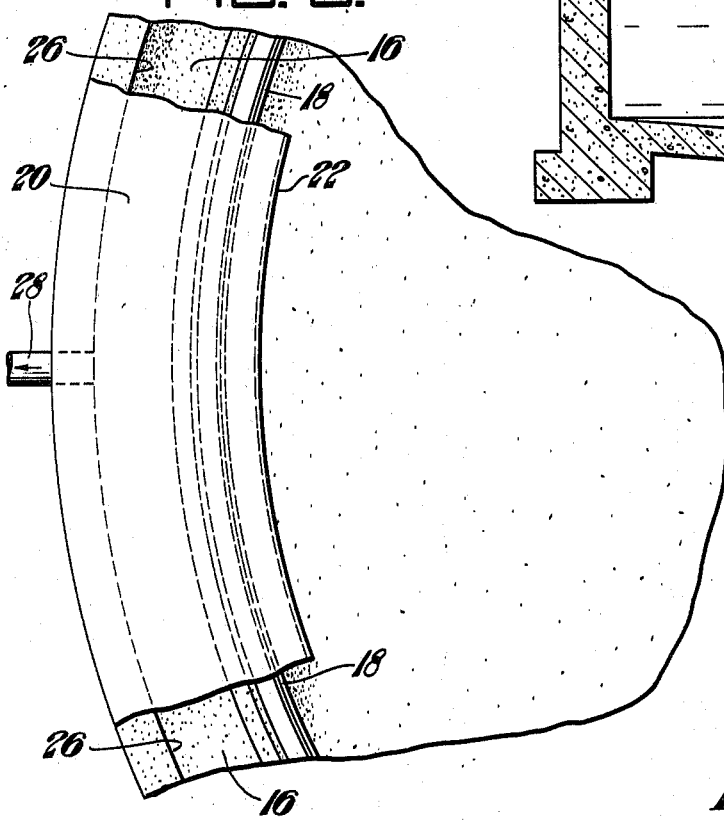

2,349,787

UNITED STATES PATENT OFFICE 2,349,787

METHOD AND MEANS FOR ELIMINATING FOG FROM WARM BODIES OF WATER

Arthur B. Haswell, Birmingham, Ala., assignor to Tennessee Coal, Iron and Railroad Company, a corporation of Tennessee Application February 12, 1942, Serial No. 430,668

4 Claims. (Cl. 21—60.5)

The present invention relates to a method and means for elimination of fog nuisance in various industrial establishments and the like. The invention is illustrated in the accompanying drawing, in which:

Figure 1 is a fragmentary section through an apparatus suitable for thickening blast furnace flue dust; and Figure 2 is a fragmentary plan view thereof.

In various industrial establishments, large tanks are used containing warm water. Due to atmospheric conditions a fog frequently arises from the surface of the water, which creates a nuisance and constitutes a serious accident hazard.

The present invention is peculiarly well suited for eliminating the fog which normally arises from the surface of water contained in a large tank in which the water is kept warm by the hot flue dust passing through it. For example, in the accompanying illustration the numeral 10 represents the annular wall of a tank or cistern made of concrete or the like which may have a diameter ranging anywhere from 50 to 100 feet. This tank is substantially filled with water and is adapted to either continuously or intermittently receive hot flue dust coming from a blast furnace gas washer or other dust producing apparatus. The flue dust enters the tank through a suitable inlet point below the level of the oil body 14 hereinafter mentioned. Thus the large body of water in the tank is continually maintained at a relatively high temperature, for example, from 120 to 130 degrees Fahrenheit, by the hot flue dust. This normally results in the production of an objectionable fog blanket, which decreases visibility in the vicinity of the apparatus and is generally regarded as a nuisance in an industrial establishment and it also constitutes a serious accident hazard.

To abate this nuisance and to increase the safety of workmen in the vicinity of apparatus which normally produces such fog, I have devised a simple yet novel expedient of blanketing the fog or preventing it from arising which consists in the step of applying to the surface of the water a blanket of liquid which is lighter than the water and is of a character not subject to fogging. For example, I have found that when a body of oil lighter than water, such as cotton seed oil, palm oil, lubricating oil or similar oil of high flash point is applied to the surface of the body of hot water, fog will be prevented from arising therefrom.

In the drawing, the numeral 12 represents the large body of water and 14 represents the blanket of lighter liquid, such as oil not subject to fogging. In the blast furnace flue dust thickener illustrated, it is customary to provide an annular overflow trough 16 separated from the main body of the tank by a weir 18. To prevent fog arising from the overflow I provide an air-tight cover 20 formed with a downwardly extending annular flange 22 which extends to a depth below the line of demarcation which separates the oil blanket from the water body. The annular flange 22 thus forms a water seal. The overflow enters the substantially air-tight compartment 26 which communicates with an effluent pipe 28 leading to a sump or a sewer at a distant point.

Having thus described my invention, what I claim is:

1. In the treatment of flue dust, the method which comprises introducing hot flue dust into a body of water, thus tending to produce a fog, and floating a protective blanket of liquid which is not subject to fogging on said water body, to prevent fog from forming and arising from said body.

2. In the treatment of flue dust, the method which comprises introducing hot flue dust into a body of water, thus tending to produce a fog, applying to the water body a blanket of oil lighter than water so as to prevent fog from forming and arising from said water body.

3. In the treatment of flue dust, the method which comprises introducing hot flue dust into a body of water, thus tending to produce a fog, floating a protective blanket of liquid which is not subject to fogging on said water body, providing for the overflow of water into a closed substantially air-tight compartment from a level below that of said protective blanket so as to maintain the water level substantially constant, and discharging the effluent in a confined stream at a remote point.

4. An apparatus of the character described comprising a tank containing a body of warm water having a blanket of oil floating thereon adapted to prevent fog from forming and arising therefrom, an air-tight compartment, means constituting a water seal for establishing an overflow connection between the tank and said air-tight compartment, and an outlet pipe for conveying the effluent in a confined stream from said compartment to a remote discharge point.

ARTHUR B. HASWELL.